March 18, 1930. E. I. GREEN 1,750,668

DETERMINING MOVEMENT AND POSITION OF MOVING OBJECTS

Filed Dec. 8, 1927

INVENTOR.
E. I. Green
BY
ATTORNEY

Patented Mar. 18, 1930

1,750,668

UNITED STATES PATENT OFFICE

ESTILL I. GREEN, OF EAST ORANGE, NEW JERSEY, ASSIGNOR TO AMERICAN TELEPHONE AND TELEGRAPH COMPANY, A CORPORATION OF NEW YORK

DETERMINING MOVEMENT AND POSITION OF MOVING OBJECTS

Application filed December 8, 1927. Serial No. 238,546.

This invention relates to methods and systems for determining, with precision, the location of a moving object and the speed and direction of its travel. The invention has particular application to such moving objects as aeroplanes and ships, where it is difficult to determine the location and speed of travel due to the lack of nearby fixed objects, but it will be readily understood that the invention is applicable to other cases than those mentioned.

In general, the invention involves the transmission in both directions between fixed and moving stations of frequencies whose phase is definitely related to a frequency generated at the observing station. At the observing station a comparison is made between the phase of the frequency generated at that station and the phase of a frequency which has been shifted in phase by transmission. In general, this phase shift is produced by tandem transmission from the observing station to a distant station and then back again. The transmission in the two directions preferably takes place at different frequencies.

The position of the moving object within one wave length may be determined by noting the phase adjustment necessary to bring the compared frequency components into phase with each other. The exact distance between the two stations may be determined by varying a frequency at the observing station over such a range as will produce one cycle of phase change at the observing point. The distance may then be determined by a simple formula from the observed frequency range.

Having determined the distance between the moving object and one fixed station, by a similar process the distance between the moving object and another fixed station may be observed. Knowing the distance between the two fixed stations, the position of the moving station is thus determined absolutely.

As the moving station passes along its course, cyclic phase changes between the compared frequency components occur at the observing station. As one of these cyclic changes of phase occurs each time the object moves with respect to the fixed station a distance equivalent to a wave length derived from the frequencies transmitted, the speed with reference to the fixed station may readily be determined. Knowing the location of the moving object with respect to two fixed stations and the speed with respect to each station, the absolute speed and direction of travel may be determined by simple trigonometric relations.

Figure 1:
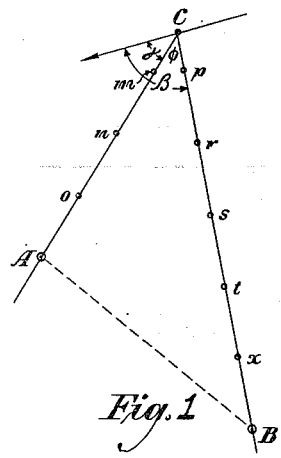
Figure 2:
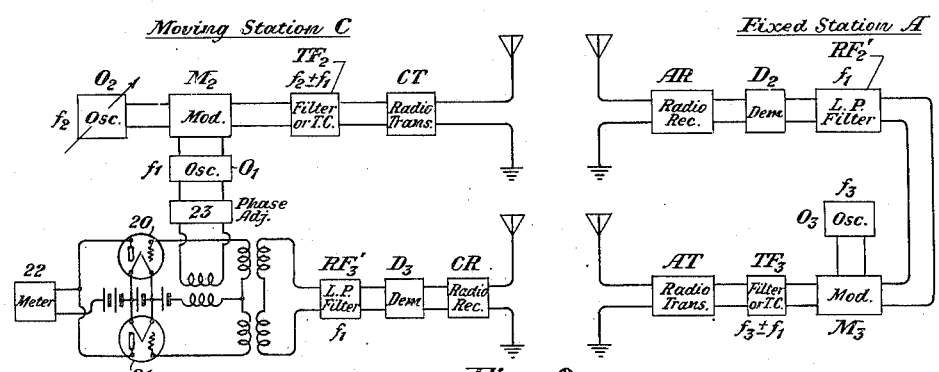
Figure 3:
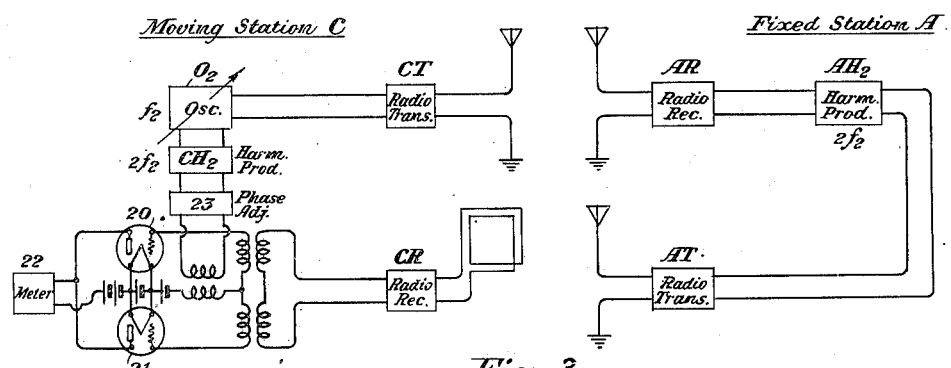

The invention will now be more fully understood from the following detailed description when read in connection with the accompanying drawing, in which Fig. 1 is a diagram illustrating how the location of a moving object and its direction of travel may be determined; Fig. 2 illustrates a circuit arrangement which may be used in connection with the invention, and Fig. 3 illustrates another form of the invention.

Fig. 2 illustrates one arrangement by which a precise location may be determined. Here, a frequency $f_1$ is generated from the moving station by means of an oscillator $O_1$, and, by means of a modulator $M_2$, modulates a frequency $f_2$ generated by an oscillator $O_2$. The frequency $f_2$, and its side frequencies $f_2+f_1$ and $f_2-f_1$ are transmitted through a selective device $TF_2$ and impressed upon a transmitter CT, by means of which the frequencies are radiated to the fixed station A. At this point, they are picked up by the radio receiving apparatus AR, and, by means of a demodulator $D_2$, the frequency $f_1$ is again derived therefrom, this frequency being selected from the other frequencies resulting from the demodulating operation by means of a selective device $RF'_2$. Through the agency of the modulator $M_3$, the frequency $f_1$ thus obtained modulates a frequency $f_3$ generated at the station A by means of an oscillator $O_3$. The resultant frequencies $f_3$, $f_3+f_1$ and $f_3-f_1$ are then passed through a selective device $TF_3$, and, by means of transmitting apparatus AT at the station A, are radiated to the moving station. At the moving station, these frequencies are demodulated by the demodulator $D_3$, and the resultant frequency $f_1$ is selected by the selective device $RF'_3$. The phase of the resultant frequency $f_1$ is then compared with that of the original frequency $f_1$ generated by the oscillator $O_1$ by means of a balanced rectifier combination comprising vacuum tubes 20 and 21, connected in such a manner that an indication of their relative phase relations is obtained for certain particular phase differences regardless of their comparative amplitudes. It will be seen that the arrangement of the balanced rectifier is such that when the two inputs differ in phase by 90°, the indication on the output meter 22 will be zero. When the inputs differ in phase by 180°, the current registered by the galvanometer 22 will be a maximum in one direction. For a 270° phase difference, the indication will again be zero, while for a 360° phase difference it will be a maximum in the opposite direction.

If, now, the frequency $f_2$ at the moving station remains fixed while the object is in motion, it is clear that the speed of travel with reference to the fixed station may be determined as follows:

The phase shift produced in the frequency $f_2$ due to transmission over the distance $a$ between stations C and A is $$\frac{a}{\lambda_2} \times 360°$$

where $\lambda_2$ is the wave length corresponding to $f_2$. Similarly the phase shifts corresponding to the frequencies $f_2+f_1$ and $f_2-f_1$ are $$\frac{a}{\lambda_2} \times 360° + \frac{a}{\lambda_1} \times 360°$$

and $$\frac{a}{\lambda_2} \times 360° - \frac{a}{\lambda_1} \times 360°,$$

respectively. When these three frequencies are applied to a demodulator at station A, the phase relation with reference to the original frequency $f_1$ of the resultant frequency $f_1$ is equal to the difference between the phase shift for the frequency $f_2$ and the phase shift for its side frequency $f_2-f_1$; and also to the difference between the phase shift for the frequency $f_2+f_1$ and the phase shift for the frequency $f_1$. Hence the phase shift produced in the frequency $f_1$ is $$\frac{a}{\lambda_1} \times 360°.$$

Similarly the phase shift resulting from transmission from A to C will likewise be $$\frac{a}{\lambda_1} \times 360°,$$

so the total phase shift for the complete transmission path will be $$\frac{2a}{\lambda_1} \times 360°.$$

From the foregoing, it follows that when the moving object increases or decreases its distance from the fixed station by an amount equal to the wave length $\frac{\lambda_1}{2}$, the galvanometer will record one cycle. Then if $K_1$ be the number of recorded cycles, $K_1\frac{\lambda_1}{2}$, is the speed of the moving object with reference to the fixed station A. And hence, if $\alpha$ is the angle between the line joining the moving object to the fixed station and the direction of travel of the moving object, the actual speed S will depend upon the relation $$S \cos \alpha = K_1 \frac{\lambda_1}{2} \quad (1)$$

If, however, the frequency $f_1$ is varied at a rate which is rapid in comparison with the time required for the motion of the object to change the indication of the galvanometer, an indication of the distance between the fixed station and the moving station will be obtained by noting the frequency variation $(f'_1-f''_1)$ required to produce a given change in phase, as, for example, a one cycle change on the galvanometer. The distance $a$ from the fixed station is then determined as follows:

The phase shift at frequency $f'_1$, in transmitting from the moving station to the fixed station, is $$\frac{a}{\lambda_{f'_1}} \times 360°$$

Similarly, the phase shift at $f''_1$ is $$\frac{a}{\lambda_{f''_1}} \times 360°$$

Now, the phase shift from the fixed station to the moving station is the same as that from the moving station to the fixed station. Hence the total difference in phase shift may be expressed $$2a\left(\frac{1}{\lambda_{f'_1}} - \frac{1}{\lambda_{f''_1}}\right) \times 360°$$

But since shifting from $f'_1$ to $f''_1$ produces a phase change of 360° at the galvanometer, the preceding expression is equal to 360°. Therefore, we may write $$2a\left(\frac{1}{\lambda_{f'_1}} - \frac{1}{\lambda_{f''_1}}\right) = 2a\left(\frac{f'_1}{V} - \frac{f''_1}{V}\right) = 1$$

from which we get $$2a = \frac{V}{f'_1 - f''_1} = \lambda(f'_1 - f''_1)$$

It is assumed in the previous discussion that the phase shift of the apparatus is independent of frequency in the range required for the variation of $f_1$. If the apparatus does not normally have this characteristic, it may be given such characteristic by the use of known phase equalizing means. By means of the above equation, the absolute distance between the moving station C and the fixed station A may be determined.

By the use of apparatus similar to that of Fig. 2, the distance $b$ between the moving station C and another fixed station B may be determined. In connection with the latter apparatus, an expression may be obtained similar to equation (1) for the speed in terms of $\beta$, (the angle between the direction of travel and the direction of the fixed station B) and in terms of a wave length corresponding to the frequency $f_1$ transmitted between station C and station B. This equation is $$S \cos \beta = K_2 \frac{\lambda_1}{2} \quad (2)$$

We now have an absolute determination of the distances $a$ and $b$, and, knowing the distance between the station A and station B, the absolute position of the moving station is given by means of a triangle similar to that of Fig. 1. Knowing the sides of this triangle, the angle $\phi$ between the sides of the triangle is at once given, and from the relation $$\beta - \alpha = \phi \quad (3)$$

together with equation (1) and the corresponding equation (2) in terms of $\beta$ and $\lambda_1$, the values of S, $\alpha$ and $\beta$ may be determined. We will then have an absolute determination of the speed, direction of motion, and location of the moving object.

It will be noted that instead of shifting one of the frequencies to determine the distance $a$ or $b$ as the case may be, the phase adjuster 23 may be adjusted instantaneously to bring the two components applied to the balanced detector in phase with each other. The extent of this adjustment gives the location of the moving object within some one wave length.

If the frequency $f_1$ is made small so that the wave length is relatively large, it will, in general, be quite possible to determine the particular wave length in which the moving object is located, particularly if the observer has in advance a general idea of his position. For example, if the frequency $f_1$ were 1,000 cycles, one wave length would correspond to 180 miles, and the location of the object within the proper 180 miles would not be difficult to determine with some previous knowledge of the general location. However, as will now be pointed out, other features may be utilized to assist in this determination.

As an aid in determining the particular wave length in which the moving object is located, loops or other direction finding apparatus of known character may be employed to indicate the approximate direction of each of the fixed stations. Thus $\alpha$, the angle between the direction of travel and the direction of the fixed station A, as well as $\beta$, the angle between the direction of travel and the direction of the fixed station B, may be approximately determined. This at once gives an approximation of the angle $\phi$, (see Fig. 1), and lines separated by the angle $\phi$ may be drawn from the station C. If the determined angle $\phi$ is correct, these lines should pass through the fixed stations A and B.

Having determined the location of the moving station within some wave length corresponding to the frequency $f_1$, as measured from station A, this fraction of a wave length will be laid out upon the line C—A, as indicated at C—$m$. Likewise, the location of the moving object in a wave length corresponding to frequency $f_1$, as measured from station B, is determined in the manner already stated, and this fraction of a wave length is laid out along the line C—B, as indicated at C—$p$. Additional wave lengths are then laid off, as indicated at $n$, $o$, etc., in the one case, and $r$, $s$, etc., in the other case. Since the distance from A to B is known, this distance may be set to proper scale upon a pair of dividers, and, by means of the points of the dividers, corresponding wave length points on the line C—A and C—B, which are separated by this distance, are then found. These points will then represent the location of the stations A and B with reference to the station C.

If, by the above method, no pair of points is found on the two lines which correspond to the distance from A to B, the line A—B should be drawn through the two points which most nearly correspond to the distance A—B, and one of the lines A—C or B—C should be shifted so that the points coincide.

By means of the relation $$\beta - \alpha = \phi \quad (3)$$

together with equations (1) and (2), the values of $\alpha$, $\beta$ and S may be determined. If the determined values of $\alpha$ and $\beta$ check closely with those observed by means of the direction finders, it may be assumed that not only will $\alpha$, $\beta$ and S, as determined from the equations, be correct, but also the distances A—C and B—C, as determined by the diagram, (Fig. 1), are correct. Thus, we will then have determined the location of the object with respect to stations A and B, its absolute speed S, and its direction of travel.

In determining the location of the moving object, it may be desirable to have the frequency $f_1$ small. For the indication of speed of travel, however, it may be desirable to have a fairly large frequency in order to secure a readily observable number of cycles in a short period of time. The choice of frequencies can be made to fit the requirements of the particular case, and, if necessary, separate apparatus might be employed for the indication of position and for the indication of speed.

The method just described in connection with Fig. 2 may be simplified by using apparatus of the type illustrated in Fig. 3. Here, an unmodulated frequency $f_2$ is generated by an oscillator $o_2$ and is transmitted by the radio transmitter CT at the moving station C to the fixed station A. At the latter point, it is received by the radio receiver AR and impressed upon a harmonic producer $AH_2$ thereat, which produces a second harmonic $2f_2$. This second harmonic is then transmitted by the radio transmitter AT at the fixed station A to the moving station, where it is picked up by the radio receiver CR. At the same time, the frequency $f_2$ generated by the oscillator $o_2$ at the moving station C is impressed upon a harmonic producer $CH_2$, to produce a second harmonic $2f_2$, the phase of which is compared with the received second harmonic by means of a balanced detector arrangement similar to that of Fig. 2.

By analogy to equation (1), the speed of the moving object with reference to the fixed station will be $$S \cos \alpha = K_1 \lambda_{(f_2 + 2f_2)}$$
$$= K_1 \lambda_{3f_2} \quad (4)$$
$$= K_1 \frac{1}{3} \lambda_2$$

The distance $a$ to the fixed station A may be determined either by varying the phase shifter 23, as described in connection with Fig. 2, or by varying the frequency $f_2$ at the moving station over such a range as will produce one cycle change on the galvanometer, just as in the case of Fig. 2. Under these conditions, the phase shift at frequency $f'_2$ will be $$\frac{a}{\lambda_{f'_2}} \times 360° + \frac{a}{\lambda_{2f'_2}} \times 360°$$

which may be expressed $$a\left(\frac{1}{\lambda_{f'_2}} + \frac{2}{\lambda_{f'_2}}\right) 360°$$

Likewise, the phase shift of frequency $f''_2$ is $$a\left(\frac{1}{\lambda_{f''_2}} + \frac{2}{\lambda_{f''_2}}\right) 360°$$

The phase difference observed by means of the galvanometer at moving station C will be the difference between the phase shifts at the two frequencies $f'_2$ and $f''_2$, and hence will be $$a\left(\frac{3}{\lambda_{f'_2}} - \frac{3}{\lambda_{f''_2}}\right) 360° = 360°$$

from which we get $$a = \frac{1}{3}\left(\frac{V}{f'_2 - f''_2}\right) = \frac{1}{3}\lambda_{(f'_2 - f''_2)} \quad (5)$$

By using similar apparatus to obtain similar data with respect to another fixed station B, the absolute position, speed and direction of motion may be determined in a manner analogous to that described in connection with the arrangement of Fig. 3.

It will be understood that in any of the schemes which have been described, transmission may take place in the opposite direction, if desired. Thus, by reversing the location of the apparatus, the indications might be obtained at the fixed station instead of at the moving station. It will also be obvious that transmission might be provided in both directions by making use of different frequencies in opposite directions, so that observations might be made both at the moving station and at the fixed station. It will also be evident that in case a very accurate indication can be obtained, by means of suitable direction finding apparatus, of the direction of a single fixed station, then the indications obtained by means of the waves transmitted between this fixed station and the moving station may suffice to determine the location, speed and direction of travel of the moving object. It will also be understood that the apparatus, when not required for determinations of movement and position, may be used for communication purposes.

Obviously, the general principles herein disclosed may be embodied in many organizations widely different from those illustrated, without departing from the spirit of the invention as defined in the following claims.

What is claimed is:

1. The method of ascertaining the movement and position of a moving object, which consists in transmitting electromagnetic waves between the moving object and a fixed station, comparing the phase of a wave as it arrives at the observing station with the phase of a wave as it appears at that point before transmission therefrom, thereby producing a resultant indication, changing the effective phase of one of the waves with respect to the other to produce a measurable instantaneous change of indication, thereby obtaining data from which the distance between the fixed station and moving object may be determined, observing the cyclic change in indication as relative phases of the two waves change with movement of the moving object through space, thereby obtaining data from which the speed of the moving object relative to the fixed station may be determined, and making similar observations with respect to waves transmitted between the moving object and a second fixed station, the complete data obtained enabling the computation of the absolute position of the moving object, its direction of travel, and its absolute speed in such direction.

2. The method of ascertaining the position of a moving object, which consists in transmitting electromagnetic waves between the moving object and a fixed station, comparing the phase of a wave as it arrives at the observing station with the phase of a wave as it appears at that point before transmission therefrom, thereby producing a resultant indication, changing the effective phase of one of the waves with respect to the other to produce a measurable instantaneous change of indication, thereby obtaining data from which the distance between the fixed station and moving object may be determined, and making similar observations with respect to waves transmitted between the moving object and a second fixed station, whereby the absolute position of the moving object may be computed.

3. The method of ascertaining the speed and direction of a moving object, which consists in transmitting electromagnetic waves between the moving object and a fixed station, comparing the phase of a wave as it arrives at the observing station, with the phase of a wave as it appears at that point before transmission therefrom, thereby producing a resultant indication, observing the cyclic change in indication as the relative phases of the two waves change with movement of the moving object through space, thereby obtaining data from which the speed of the moving object relative to the fixed station may be determined, and making similar observations with respect to waves transmitted between the moving object and a second fixed station, the complete data obtained enabling the computation of the direction of motion and absolute speed of the moving object in such direction when its position is known.

4. The method of ascertaining the movement and position of a moving object, which consists in transmitting electromagnetic waves between a fixed station and the moving object, observing the total phase shift undergone by a wave in its travel, momentarily adjusting a circuit element acted upon by one of the waves until a zero indication results, so that from the observed adjustment the position of the moving object may be determined within a wave length corresponding to the frequency of the observed wave, observing the cyclic change in indication as the phase of the observed wave changes with movement of the moving object through space, thereby obtaining data from which the speed of the moving object relative to the fixed station may be determined, and making similar observations with respect to waves transmitted between a second fixed station and the moving object, the complete data obtained enabling the computation of the absolute position of the moving object, its direction of travel, and its absolute speed in such direction.

5. The method of ascertaining the position of a moving object, which consists in transmitting electromagnetic waves between a fixed station and a moving object, observing the total phase shift undergone by a wave in its travel, momentarily adjusting a circuit element acted upon by one of the waves until a zero indication results, so that from the observed adjustment the position of the moving object may be determined within a wave length corresponding to the frequency of the observed wave, and making similar observations with respect to waves transmitted between a second fixed station and the moving object, the complete data enabling the computation of the absolute position of the moving object when the distance between the fixed stations and their direction from the moving station is known.

6. The method of ascertaining the speed and direction of a moving object, which consists in transmitting electromagnetic waves between a fixed station and a moving object, observing the phase shift undergone by a wave in its travel, observing the cyclic change in indication as the phase of the observed wave changes with movement of the moving object through space, thereby obtaining data from which the speed of the moving object relative to the fixed station may be determined, and making similar observations with respect to waves transmitted between a second fixed station and the moving object, the complete data obtained enabling the computation of the direction of motion and absolute speed of the moving object in such direction when its position is known.

7. In a system for ascertaining the movement and position of a moving object, means for transmitting electromagnetic waves between the moving object and a fixed station, means at one of said points to compare the phase of a wave as it arrives at said point with the phase of a wave as it appears thereat before transmission therefrom, means to change the effective phase of one of the waves with respect to the other to produce an instantaneous change of the indicated comparison, thereby obtaining data from which the distance between the fixed station and the moving object may be determined, means to indicate a cyclic change in the comparative phase of the two waves as the moving object moves through space, thereby obtaining data from which the speed of the moving object relative to the fixed station may be determined, means for transmitting similar electromagnetic waves between the moving object and a second fixed station, and means for making observations with respect to the waves so transmitted which are similar to those made with respect to the waves transmitted between the moving object and said first station, whereby data may be obtained enabling the computation of the absolute position of the moving object, its direction of travel, and its absolute speed in such direction.

8. In a system for ascertaining the position of a moving object, means for transmitting electromagnetic waves between the moving object and a fixed station, means at one of said points for comparing the phase of a wave as it arrives at said point with the phase of a wave as it appears thereat before transmission therefrom, means to change the effective phase of one of the waves with respect to the other to produce an instantaneous change of the indicated comparison, thereby obtaining data from which the distance between the fixed station and the moving object may be determined, means to transmit electromagnetic waves between the moving object and a second fixed station, and means for making observations with respect to the waves so transmitted which are similar to those made with respect to the waves transmitted between the moving object and said first station, whereby data may be obtained from which the absolute position of the moving object may be computed.

9. In a system for ascertaining the speed and direction of a moving object, means for transmitting electromagnetic waves between the moving object and a fixed station, means at one of said points for comparing the phase of a wave as it arrives at said point with the phase of a wave as it appears thereat before transmission therefrom, means to indicate a cyclic change in the comparative phase shift of the two waves as the moving object moves through space, thereby obtaining data from which the speed of the moving object relative to the fixed station may be determined, means to transmit electromagnetic waves between the moving object and a second fixed station, and means for making observations with respect to the waves so transmitted which are similar to those made with respect to the waves transmitted between the moving object and said first station, whereby the complete data obtained will enable the computation of the direction of motion and absolute speed of the moving object in such direction when its position is known.

10. In a system for ascertaining the movement and position of a moving object, means for transmitting electromagnetic waves between a fixed station and the moving object, means associated with the moving object for observing the total phase shift undergone by a wave in its travel, means to momentarily adjust a circuit element acted upon by one of the waves until a zero indication results, so that from the observed adjustment of the circuit element the position of the moving object may be determined within a wave length corresponding to the frequency of the observed wave, means to indicate a cyclic change in the phase shift of the wave as the moving object moves through space, thereby obtaining data from which the speed of the moving object relative to the fixed station may be determined, means for transmitting electromagnetic waves between a second fixed station and the moving object, means for making observations with respect to the waves transmitted between the second fixed station and the moving object which are similar to those made with respect to the waves transmitted between the first fixed station and the moving object, whereby the complete data obtained will enable computation of the absolute position of the moving object, its direction of travel, and its absolute speed in such direction.

11. In a system for ascertaining the position of a moving object, means for transmitting electromagnetic waves between a fixed station and a moving object, means associated with the moving object for observing the total phase shift undergone by a wave in its travel, means to momentarily adjust a circuit element acted upon by one of the waves until a zero indication results, so that from the observed adjustment the position of the moving object may be determined within a wave length corresponding to the frequency of the observed wave, means for transmitting electromagnetic waves between a second fixed station and the moving object, and means for making observations with respect to the waves transmitted between the second fixed station and the moving object which are similar to those made with respect to the waves transmitted between the first fixed station and the moving object, whereby the complete data obtained will enable the computation of the absolute position of the moving object when the distances to the fixed stations and their direction from the moving station is known.

12. In a system for ascertaining the speed and direction of a moving object, means for transmitting electromagnetic waves between a fixed station and the moving object, means associated with the moving object for observing the total phase shift undergone by a wave in its travel, means to indicate a cyclic change in the phase shift of the wave as the moving object moves through space, thereby obtaining data from which the speed of the moving object relative to the fixed station may be determined, means to transmit electromagnetic waves between the second fixed station and the moving object, and means for making observations with respect to the waves transmitted between the second fixed station and the moving object which are similar to those made with respect to the waves transmitted between the first fixed station and the moving object, whereby the complete data obtained will enable the computation of the direction of motion and absolute speed of the moving object in such direction, when its position is known.

13. The method of ascertaining the movement and position of a moving object, which consists in generating a frequency at the observing station, transmitting in both directions between the fixed and moving stations frequencies whose phase is definitely related to the frequency generated at the observing station, comparing the phase of the frequency generated at the observing station with the phase of a frequency which has been shifted in phase by transmission, changing the effective phase of one of the waves with respect to the other to produce a measurable instantaneous change of indication, thereby obtaining data from which the distance between the fixed station and the moving object may be determined, observing the cyclic changes in indication as relative phases of the compared waves change with movement of the moving object through space, thereby obtaining data from which the speed of the moving object relative to the fixed station may be determined, and making similar observations with respect to waves transmitted between the moving object and a second fixed station, the complete data obtained enabling the computation of the absolute position of the moving object, its direction of travel and its absolute speed in such direction.

14. The method of ascertaining the position of a moving object, which consists in generating a frequency at the observing station, transmitting in both directions between the fixed and moving station frequencies whose phase is definitely related to the frequency generated at the observing station, comparing the phase of the frequency generated at the observing station with the phase of a frequency which has been shifted in phase by transmission, changing the effective phase of one of the waves with respect to the other to produce a measurable instantaneous change of indication, thereby obtaining data from which the distance between the fixed station and moving object may be determined, and making similar observations with respect to waves transmitted to the moving object and a second transmitting station whereby the absolute position of the moving object may be computed.

15. The method of ascertaining the speed and direction of a moving object, which consists in generating a frequency at the observing station, transmitting in both directions between the fixed and moving station frequencies whose phase is definitely related to the frequency generated at the observing station, comparing the phase of the frequency generated at the observing station with the phase of a frequency which has been shifted in phase by transmission, observing the cyclic change in indication as relative phases of the two waves change with movement of the moving object through space, thereby obtaining data from which the speed of the moving object relative to the fixed station may be determined, and making similar observations with respect to waves transmitted between the moving object and a second fixed station, the complete data obtained enabling the computation of the direction of motion and absolute speed of the moving object in such direction when its position is known.

16. The method of ascertaining the movement and position of a moving object, which consists in generating a frequency at the observing station, transmitting in both directions between the fixed and moving stations frequencies whose phase is definitely related to the frequency generated at the observing station, comparing the phase of the frequency generated at the observing station with the phase of a frequency which has been shifted in phase by transmission, shifting the frequency of the wave generated at the observing station through a range sufficient to change by a predetermined amount the absolute phase difference between the compared waves, thus obtaining data from which the distance between the fixed station and moving object may be determined, observing the cyclic changes in indication as relative phases of the compared waves change with movement of the moving object through space, thereby obtaining data from which the speed of the moving object relative to the fixed station may be determined, and making similar observations with respect to waves transmitted between the moving object and a second fixed station, the complete data obtained enabling the computation of the absolute position of the moving object, its direction of travel and its absolute speed in such direction.

17. The method of ascertaining the position of a moving object, which consists in generating a frequency at the observing station, transmitting in both directions between the fixed and moving station frequencies whose phase is definitely related to the frequency generated at the observing station, comparing the phase of the frequency generated at the observing station with the phase of a frequency which has been shifted in phase by transmission, shifting the frequency of the wave generated at the observing station through a range sufficient to change by a predetermined amount the observed phase difference between the compared waves, thus obtaining data from which the distance between the fixed station and moving object may be determined, and making similar observations with respect to waves transmitted between the moving object and a second fixed station whereby the absolute position of the moving object may be computed.

In testimony whereof, I have signed my name to this specification this 7th day of December, 1927.

ESTILL I. GREEN.